United States Patent
Ivanic et al.

(10) Patent No.: US 9,188,151 B2
(45) Date of Patent: Nov. 17, 2015

(54) EYE BOLT

(75) Inventors: Ranko Ivanic, Bruck an der Mur (AT); Ägyd Pengg, Klagenfurt (AT)

(73) Assignee: Pewag Austria Gmbh, Kapfenberg (AT)

( * ) Notice: Subject to any disclaimer, the term of this patent is extended or adjusted under 35 U.S.C. 154(b) by 132 days.

(21) Appl. No.: 13/991,106

(22) PCT Filed: Dec. 2, 2010

(86) PCT No.: PCT/EP2010/007326
§ 371 (c)(1),
(2), (4) Date: May 31, 2013

(87) PCT Pub. No.: WO2012/072095
PCT Pub. Date: Jun. 7, 2012

(65) Prior Publication Data
US 2013/0251444 A1    Sep. 26, 2013

(51) Int. Cl.
*F16B 45/00* (2006.01)
*B60P 7/08* (2006.01)

(52) U.S. Cl.
CPC ............... *F16B 45/00* (2013.01); *B60P 7/0807* (2013.01); *Y10T 403/32213* (2015.01)

(58) Field of Classification Search
CPC .................................. F16B 45/00; F16B 35/06
USPC .................... 411/411, 401, 396, 393
See application file for complete search history.

(56) References Cited

U.S. PATENT DOCUMENTS

| | | | | |
|---|---|---|---|---|
| 1,346,867 A | * | 7/1920 | Weibull | 411/393 |
| 2,748,646 A | * | 6/1956 | Harold et al. | 411/389 |
| 3,545,051 A | * | 12/1970 | Kennard | 294/82.22 |
| 4,558,979 A | | 12/1985 | Andrews | |
| 4,958,796 A | * | 9/1990 | Bernosky | 248/317 |
| 5,054,982 A | * | 10/1991 | Freeman | 411/400 |
| 5,286,130 A | * | 2/1994 | Mueller | 403/79 |
| 5,499,432 A | * | 3/1996 | Terada et al. | 24/599.2 |
| 5,634,734 A | * | 6/1997 | Schron et al. | 403/78 |
| 5,690,457 A | | 11/1997 | Smetz | |
| 6,022,164 A | | 2/2000 | Tsui et al. | |
| 6,179,537 B1 | * | 1/2001 | Anders | 411/392 |
| 8,757,693 B2 | * | 6/2014 | Fuller et al. | 294/215 |

FOREIGN PATENT DOCUMENTS

| | | |
|---|---|---|
| CN | 201485175 U | 5/2010 |
| DE | 93 16 475 U1 | 4/1995 |

(Continued)

*Primary Examiner* — Flemming Saether
(74) *Attorney, Agent, or Firm* — Christensen Fonder, P.A.

(57) ABSTRACT

An eye bolt, comprising a lifting eye and a supporting bolt, wherein the supporting bolt sits, rotatable, in an insertion opening of the lifting eye and comprises, a threaded shaft and a bolt head. The supporting bolt protrudes radially from the lifting eye and is supported by an underside of the lifting eye, on a bearing surface formed on the lifting eye and running around the insertion opening. The eye bolt further comprises at least one locking member which can be brought into engagement with the bolt head and by means of which, in a locking position of same, the bolt head can be rotationally blocked vis-à-vis the lifting eye. The at least one locking member is further attached to the lifting eye radially next to the bolt head and is secured there, wherein the at least one locking member can be brought into a starting position, in which it is not engaged with the bolt head, and also into the locking position rotationally blocking the supporting bolt relative to the lifting eye.

6 Claims, 3 Drawing Sheets

(56) References Cited

FOREIGN PATENT DOCUMENTS

| | | |
|---|---|---|
| EP | 0 161 652 A2 | 11/1985 |
| EP | 0 654 611 A1 | 5/1995 |
| JP | 40-000301 U | 1/1940 |
| JP | 50-009967 U | 1/1975 |
| JP | 52-137473 U | 10/1977 |
| JP | 2006-118676 A | 5/2006 |

* cited by examiner

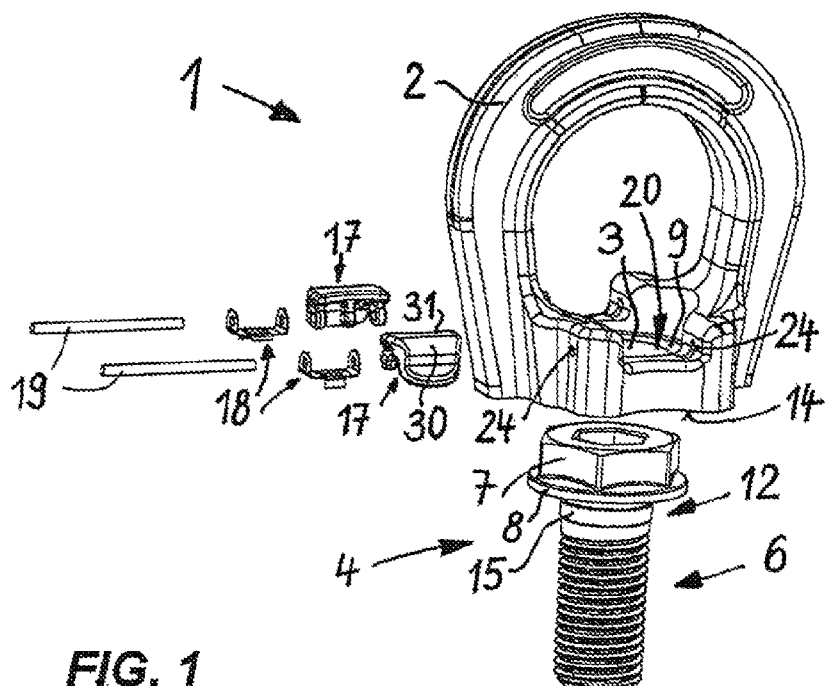
FIG. 1
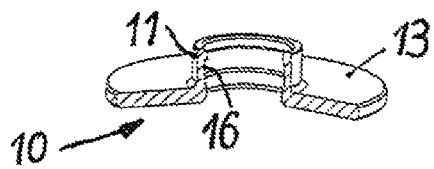
FIG. 2
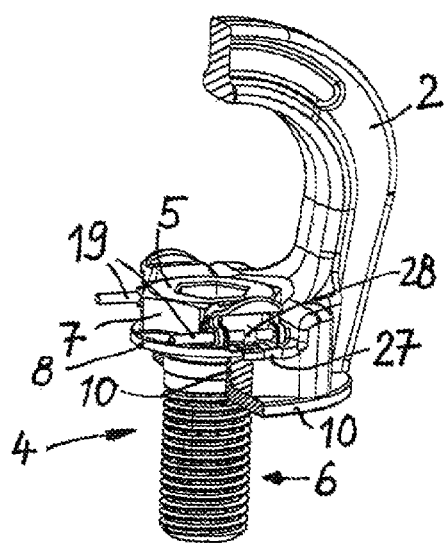

EYE BOLT

PRIORITY CLAIM

The present application is a National Phase entry of PCT Application No. PCT/EP2010/007326, filed Dec. 2, 2010, the disclosure of which is hereby incorporated by reference herein in its entirety.

FIELD OF THE INVENTION

The invention relates to an eye bolt with a lifting eye and a supporting bolt which sits, rotatable, in an insertion opening of the lifting eye, is provided with a threaded shaft and has a bolt head, protruding radially from the latter, which is supported, by its underside, on a bearing surface formed on the lifting eye and running around the insertion opening, and with at least one locking member which can be brought into engagement with the bolt head and by means of which, in a locking position of same, the bolt head can be rotationally blocked vis-à-vis the lifting eye.

BACKGROUND OF THE INVENTION

Eye bolts in which the supporting bolt in the form of a threaded stem is secured in one piece to the lifting eye and, by rotating them, can be screwed into a receiving hole of an item to be coupled are known and standardized e.g. by DIN 580. Although these known eye bolts can be installed or removed without an additional tool, they have the disadvantage that they cannot be aligned in the direction of load and thus, when they are used, either they cannot be screwed in fully or may become unscrewed. With such eye bolts designed as one piece, there is always the danger that the threaded stem will be overloaded or loosened by a torque acting on the lifting eye, which can result in the threaded bolt bending, or even breaking.

Eye bolts are also known in which the supporting bolt provided with a threaded shaft is accommodated with a little play in an insertion opening of the lifting eye and is held there rotatably (DE 93 16 475 U1). Therefore for multistrand or lateral applications only such so-called "rotatable" eye bolts are recommended. However, when they are installed or removed, it is necessary to use an additional tool (usually an Allen key) which then has to be stored again separately after installation or removal, wherein there is the danger that this key will be lost or mislaid.

An eye bolt of the type named at the beginning is known from EP 0 654 611 A1. However, this also requires the use of its own tool to turn the screw during installation or removal. In addition to a separate storage of the tool, however, this document also describes the possibility of coupling the tool with the lifting eye of the eye bolt such that a screwing movement can thus be introduced into the supporting bolt via the lifting eye, and when not in use, when it is not engaged with the supporting bolt, of suspending the tool captively on the eye bolt. However, the tools described there protrude significantly onto the outside of the lifting eye both when engaged with the supporting bolt and when not engaged with the latter, which is why there is the danger, when used in a confined space, that the outwardly projecting part of the tool catches on an item located in the confined space when the eye is rotated, and then a further rotation of the lifting eye to screw in the supporting bolt may possibly be blocked. In addition, the embodiments shown there for tools coupled with the lifting eye are not completely closed, with the result that, because of the elasticity of the material used for the tool, it is possible to widen the opening present in each case to such an extent that the screwing tool can be separated from the lifting eye or also subsequently connected to it. However, this also entails the danger that, due to the elasticity of the material, the tool and the lifting eye can unintentionally become separated as a result of an external effect on the tool.

BRIEF SUMMARY OF THE INVENTION

Starting from here, the object of the invention is to further develop such an eye bolt such that the disadvantages shown can be avoided and it is also possible to use the eye bolt in a confined space without difficulty, to the extent that the lifting eye can actually be rotated in the space.

According to the invention, this is achieved with an eye bolt of the type named at the beginning in that the at least one locking member is attached to the lifting eye radially next to the bolt head and is secured there, wherein it can be brought into a starting position, in which it completely releases the bolt head, and into its locking position in which it blocks the bolt head in rotation direction vis-à-vis the lifting eye.

With the eye bolt according to the invention, firstly a separate tool is no longer used for the locking member, with the result that the danger of losing the tool no longer exists. Attaching the locking member radially next to the bolt head and securing it there on the lifting eye leads to a very space-saving arrangement which makes it possible to design the locking member such that it no longer projects radially outwards over the outer circumferential surface of the lifting eye, with the result that when the eye bolt according to the invention is used it is also possible for it to be used in a confined space if the lifting eye, because of its specified shape, can actually be rotated there.

The invention provides the possibility of a relatively space-saving design of the eye bolt, in particular its lifting eye, despite the presence of the at least one locking member for blocking the rotation of the supporting bolt in the lifting eye. As the locking member in the eye bolt according to the invention serves only, in its locking position, to block the rotatability of same vis-à-vis the lifting eye, a large design of the locking member that takes up a lot of space, such as is used in the known cases in which the locking member consists of a screwing tool which has to be coupled on the one hand to the screw and on the other hand to the circumferential frame of the lifting eye, can also be avoided because it is secured directly to the lifting eye in the area next to the bolt head.

A particularly preferred embodiment of the eye bolt according to the invention is that two locking members lying radially opposite each other in respect of the bolt head are provided the arrangement of which is quite particularly preferably chosen such that the diameter of the bolt head on which the longitudinal center lines of these two locking members lie is perpendicular to the mounting plane of the lifting eye. By using two such locking members which lie radially opposite each other in respect of the head of the supporting bolt, comparatively large torques which act on the lifting eye in the rotation direction of the supporting bolt can also be transferred to it.

Each locking member can be designed in any suitable shape which makes it possible according to the invention to move or shift the locking member between its locking position for blocking the rotation of the bolt and its starting position in which there is no engagement with the bolt.

In an advantageous embodiment of the invention, this can take place in that each locking member is formed as a part that can be moved radially relative to the bolt head, which can be shifted towards the bolt head until actively engaged with same (to establish the blocking function) and away from the bolt head into its starting position in order to release same.

Another, quite particularly advantageous embodiment of the invention, however, is that each locking member is formed as a rocker which brings about the desired blocking of the rotation of the supporting bolt in one of its tilt end-positions, while it releases the supporting bolt in the other tilt end-position.

It is furthermore of particular advantage if, in the invention, each locking member is lockable in each case in both its locking position and its starting position, wherein particularly preferably each locking member can be pretensioned in spring-loaded manner into both its locking position and its starting position.

The bolt head can be blocked in rotation direction vis-à-vis the lifting eye by the locking member in its locking position in any suitable manner. However, the bolt head is quite particularly preferably blocked in positive-locking manner in rotation direction vis-à-vis the lifting eye by each locking member in the locking position of the latter. The construction of such a rotation-blocking positive locking by the locking member in its locking position can be achieved in a large number of different designs.

However, with the eye bolt according to the invention, the supporting bolt is quite particularly preferably provided with a hexagon head. This is not only a quite conventional design, customary in the trade, of pintles, but also a shaping of the bolt head which makes possible, in a simple manner, a positive-locking interaction with a locking member in its locking position.

This can preferably be brought about in that each locking member in its locking position rests against an outer side surface of the hexagon head of the supporting bolt at least along a linear contact, but particularly preferably by means of a planar contact, whereby, as a result of the locking member and bolt head resting against each other along at least a linear contact lying in a flat surface, a blocking of the rotation of the bolt head is triggered by the locking member.

A quite particularly preferred embodiment of the eye bolt according to the invention with the design of the locking member as a rocker, however, is that each such locking member is attached to the lifting eye in an upper recess to the side of the insertion opening, wherein this recess is aligned perpendicular to the center axis of the insertion opening of the lifting eye and the locking member sits on a pivot axle, lying perpendicular to the alignment of the recess, which for its part is held rotatably by a retaining clasp secured in the recess, wherein this comprises a U-shaped cross-section with two side arms connected to each other via a center bar. This embodiment results in a quite particularly space-saving design and arrangement of the rocker on the lifting eye, is inexpensive, easy to install, and each rocker designed and arranged in such a way can be brought into its two tilt end-positions (starting position, locking position) without difficulty by an operator.

Particularly preferably, in this embodiment a shaping is applied to each rocker on its underside facing the retaining clasp, which is in active connection with a spring bar protruding from the center bar of the retaining clasp in the direction of the rocker such that, during a tilting movement of the rocker, it elastically deforms the spring bar when the latter is overrun, wherein, when the rocker reaches its tilt end-position, the spring bar resumes its starting shape in which it locks the rocker via the shaping in its respective tilt end-position under spring-loaded pretension. This structural design of the eye bolt according to the invention is a comparatively simple construction, can be installed quickly and without difficulty, be produced with little outlay and is remarkably space-saving, furthermore it can be operated simply and quickly and overall is very effective as well as suitable for transferring larger torques from the lifting eye to the supporting bolt.

Each rocker is preferably designed such that it is supported in each case via a rocker arm in its starting position on the lifting eye and in its locking position on the bearing surface on the lifting eye and/or on a ring surface of a ring band running around the supporting bolt below its bolt head and protruding radially from the bolt head at least in sections. Particularly preferably, for each rocker in each of its tilt end-positions the outer surface, facing away from the pivot axle, of the rocker arm in each case supported there is designed lying approximately parallel to the longitudinal center axis of the supporting bolt, as a result of which this rocker arm lies planar on a side surface of the e.g. hexagon head of the supporting bolt, and a very strong blocking effect in the rotation direction of the supporting bolt thus results.

In the case of the eye bolt according to the invention, it is also particularly advantageous if the supporting bolt sits rotatably in a collet accommodated in the insertion opening of the lifting eye such that it is captively connected to the latter. In this way, the eye bolt is held rotatably, and simultaneously as a unit, in the assembled state.

BRIEF DESCRIPTION OF THE DRAWINGS

The invention is explained in principle in even more detail below with the help of the drawings by way of example. There are shown in:

FIG. 1 a perspective exploded representation of an eye bolt according to the invention;

FIG. 2 a perspective representation of the eye bolt from FIG. 1 in the installed state, wherein however the lifting eye is cut in a plane running through the longitudinal axis of the supporting bolt;

DETAILED DESCRIPTION OF THE INVENTION

Figures 3, 4:
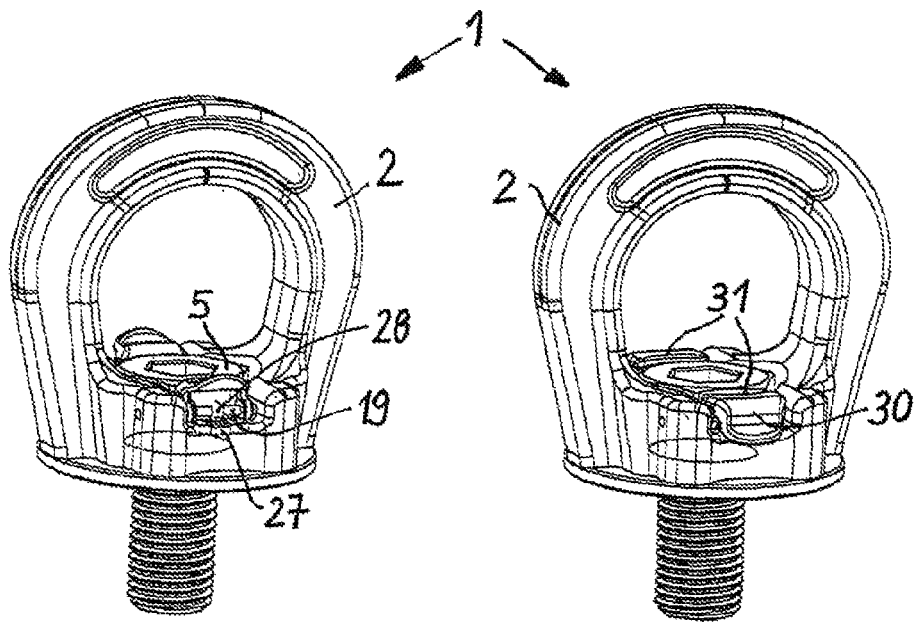
FIG. 3 the eye bolt according to the invention corresponding to FIGS. 1 and 2, in perspective representation in the installed state and with the locking members in locking position.
FIG. 4 the bolt from FIG. 3, but with the locking members in the starting position.

In the figures, a particularly preferred embodiment of an eye bolt 1 is shown which, as can best be seen from the perspective exploded representation of FIG. 1, comprises a lifting eye 2 which is provided in its lower section with an insertion opening 3 for insertion of a supporting bolt 4. This has a bolt head 5 as well as a threaded shaft 6 with which the eye bolt 1 can be screwed onto an item for accommodating it.

The bolt head 5 of the supporting bolt 4 is provided with a hexagon head 7 which sits on a circumferential ring band 8.

When the eye bolt 1 is assembled, the supporting bolt 4 rests with the underside of the ring band 8 on a flat bearing surface 9, formed on the lifting eye 2 and running around the insertion opening 3, and is supported from below on the latter.

As FIG. 2 shows, in the perspective representation of which however the lifting eye 2 is represented cut in a vertical center plane (in which the center axis of the supporting bolt 4 also lies), in the assembled state of the eye bolt 1 a collet 10 is pushed from below over the threaded shaft 6 of the supporting bolt 4 inserted through the insertion opening 3, namely until its upwardly directed ring extension 11 surrounds a non-threaded shaft section 12 of the supporting bolt 4, directly axial behind the bolt head 5. This non-threaded shaft section 12, as can be seen from FIG. 1, has a central shaft area 15, slightly enlarged radially, which, when the collet 10 is fitted, extends into a radial ring recess 16 on the wall of the inner opening of the collet 10, wherein the diameter of this recess 16 is somewhat larger than the diameter of the radially enlarged shaft area 15. However, as this radially enlarged shaft area 15 has a diameter which, although it is smaller than the diameter of the recess 16 of the inner opening of the collet 10, is otherwise larger than the internal diameter of the inner surface of the collet 10, this means that, when the collet 10 is fully pushed on and the radially enlarged shaft area 15 of the supporting bolt 4 is engaged in the recess 16 of the collet 10, the supporting bolt 4 is accommodated rotatably but captively in the collet 10 with a slight radial play. During the pushing on of the collet 10 over the threaded shaft 6 of the supporting bolt 4, when the non-threaded shaft section 12 is reached, then, when the radially enlarged shaft area 15 enters the inner opening of the collet 10, the collet can be forced over the radially enlarged shaft area 15, by means e.g. of a light hammer blow or the like, until it has entered the radially enlarged recess 16 of the collet 10.

As can furthermore also be seen from the exploded representation of FIG. 1, the eye bolt 1 in addition also has two rockers 17, two retaining clasps 18 for the latter and two pivot axles 19, each for the tiltable arrangement of a rocker 17 on a retaining clasp 18.

As can be seen in addition from FIGS. 1 and 2, there is formed on the lifting eye 2 in its lower area, in which the insertion opening 3 for accommodating the supporting bolt 4 is placed, a recess 20 on each of both sides of this insertion opening 3 shown from above on the area of the lifting eye 2 there. These two recesses 20 on both sides of the bolt head 5 are formed in each case such that they are present radially offset by 180° relative to the bolt axis and are aligned relative to each other, i.e. their alignment runs perpendicular to the longitudinal center axis of the supporting bolt 4 and simultaneously also perpendicular to the mounting plane of the lifting eye 2, as can also be seen well in particular from the representation of FIG. 1.

Figure 5:
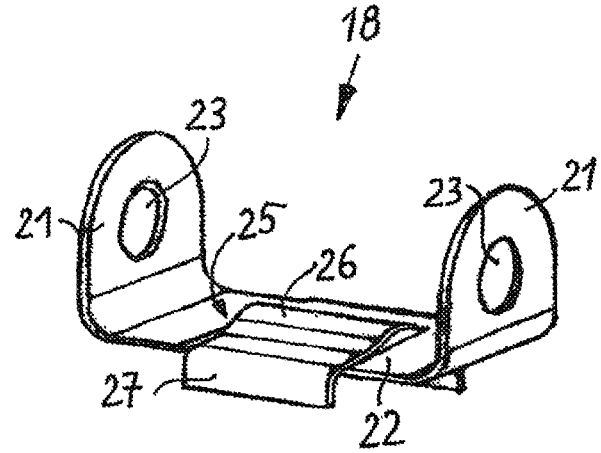
FIG. 5 an enlarged perspective representation of a retaining clasp used to store a locking member, and FIG. 6 an enlarged detail representation of the holder area of the lifting eye for the supporting bolt.

In each case a retaining clasp 18 is clipped onto the base of each of these recesses 20. Such a retaining clasp is shown enlarged in perspective representation in FIG. 5:

Each retaining clasp 18, as can be seen from FIG. 5, has two side arms 21 which lie parallel to each other and are connected to each other at one end via a center bar 22.

An opening 23 is formed in each side arm 21, wherein the two openings 23 of the two side arms 21 are aligned relative to each other such that in each case a pivot axle 19 (cf. FIG. 1), on which, as FIGS. 2 and 3 show, in each case a rocker 17 sits pivotably and also guided laterally in pivot direction, can be pushed through them.

The recesses 20 have a depth and a width (parallel to the mounting plane of the lifting eye 2) such that when a rocker 17 is installed in each of them in its starting position, shown in FIG. 4, in which there is no active engagement with the bolt head 5 of the supporting bolt 4, the upper surface of the rocker 17 lies approximately on the surface level of the lifting eye 2 present there to the side of the recess 20. The width of the recess 20 is chosen such that in each case the allocated retaining clasp 18 and the corresponding rocker 17 can be installed in it with some lateral play.

The pivot axle 19 for each recess 20, however, is much longer than the lateral width of the recess 20 concerned, wherein the pivot axle 19 extends on both sides of the recess 20 into a bearing opening 24 placed there laterally in each case. The respective rocker 17 can sit pivotably on the allocated pivot axle 19 and the latter be housed unrotatably, seated fixed, in the bearing openings 24. However, the rocker 17 can also be attached fixedly to the pivot axle 19 and be provided pivotable with same in the openings 23 in the side arms 21 of the retaining clasp 18 as well as in the bearing openings 24.

As FIG. 5 shows, there is provided in the central area of the center bar 22 of the retaining clasp 18 a spring plate 25 which, slightly offset laterally relative to the position of the openings 23, forms an upwardly protruding and arched spring bar 26 and is bent at its end area 27 facing the outside of the lifting eye 2 by approximately 90° relative to the center bar 22 of the retaining clasp 18. This bent end area 27 of the spring plate 25 rests against the outer edge of the recess 20 in the installed state, as can be seen from the representations of FIGS. 2, 3 and 6. For the remaining shape of the design of the spring plate 25 in the embodiment example shown in the figures, explicit reference is made to the graphic representation of FIG. 5 as essential to the invention.

The spring plate 25 sits on the center bar 22 of the retaining clasp 18 such that in the case of an action of pressure from above onto the spring bar 26 this is deformed such that the radius of curvature of its curve becomes larger and the curve thus becomes flatter, wherein it is attached to the retaining clasp 18 such that it can compensate for a change in length occurring during its flattening relative to the center bar 22 of the retaining clasp 18.

Figure 6:
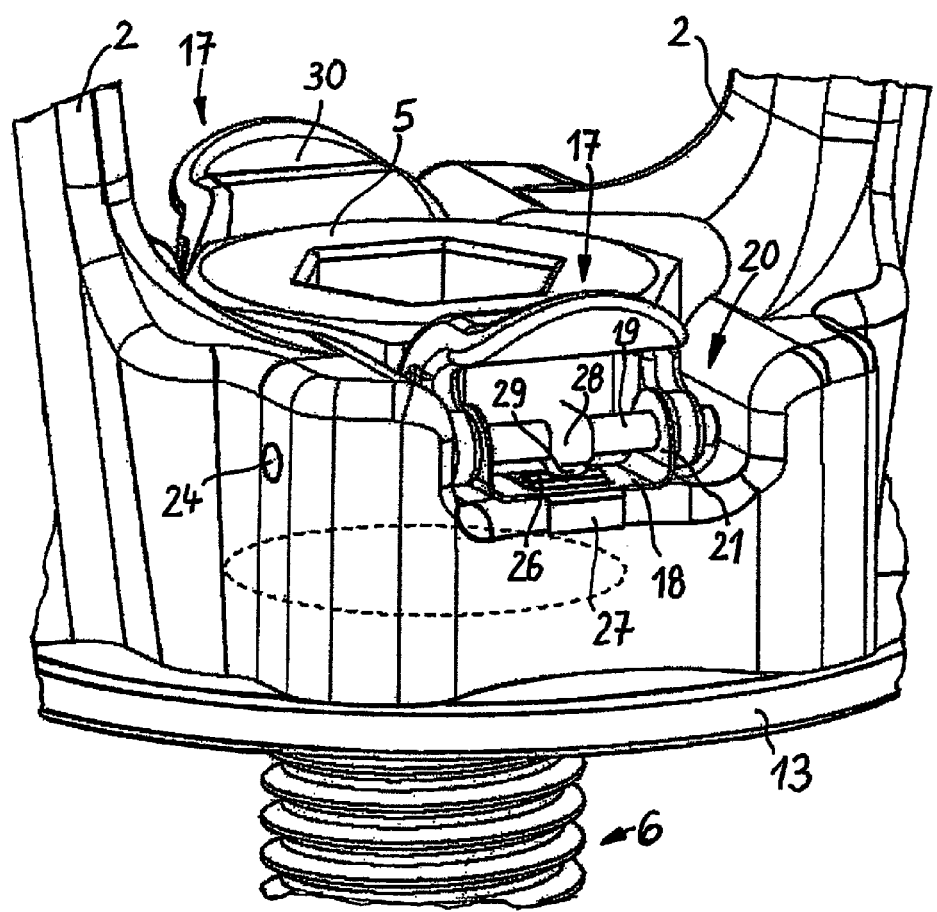

There is provided on the underside of each rocker 17, facing the center bar 22 of the retaining clasp 18, in its central area which corresponds, in the installed state, to the position of the spring plate 22 in the retaining clasp 18, a shaping 28, as can be particularly clearly seen from FIG. 6, which shows the lower central area of the lifting eye 2 with installed supporting bolt 4 in enlarged representation.

The shaping 28, as can be seen from FIG. 6, grips around the pivot axle 19 and is rotated about the pivot axle 19 (either relative to the latter or together with it about its center axis) during the tilting of the rocker 17.

The shaping 28 has an active protrusion 29 which protrudes there radially and comes into active contact and active engagement with the spring bar 26 of the spring plate 25 during the tilting of the rocker 17. During the tilting of the rocker 17, the active protrusion 29 runs from one side of the center bar 22 of the retaining clasp 18 to the arched spring bar 26 and beyond it, wherein the spring bar 26 is pressed downwards and elastically deformed. It presses against the active protrusion 29 with its elastic restoring force. As soon as this has been guided across the center of the spring bar 26, the spring bar 26 presses against a side flank of the active protrusion 29 with its elastic restoring force, with the result that the latter is pretensioned in spring-loaded manner in the tilt direction and is pressed into the corresponding tilt end-position. This applies to both tilt directions of the rocker 17, wherein the design of the active protrusion 29 can be used to ensure that the latter is still loaded by a certain elastic restoring force of the spring bar 26 in each of the two tilt end-positions of the rocker 17 and is thus held in this tilt end-position under spring-loaded pretension.

As the representation of FIG. 1 shows furthermore, each rocker 17 consists of a first rocker arm 30 and a second rocker arm 31 attached inclined at an angle to the latter of approximately 90°.

In the starting position of the rocker 17, in which the latter is not actively engaged with the bolt head 5 of the supporting bolt 4 and the latter is freely rotatable in the insertion opening 3 of the lifting eye 2, which position is shown in FIG. 4, each rocker 17 is tilted such that it is raised into its outer rocker end-position, in which it is supported against or in the recess 20 via this first rocker arm 30. In this position, the second rocker arm 31 is then tilted upwards, wherein its outer surface lies perpendicular to the longitudinal center axis of the insertion opening 3.

If the rocker 17 is tilted into its locking position, however, as represented in FIGS. 2 and 3 as well as in particular in FIG. 6, it is then supported in this rocker end-position on the second rocker arm 31, which then, as these figures show, rests with its outside against a facing side surface of the hexagon head 7 of the bolt head 5 and is held in this tilt end-position under spring-loaded pretension by the spring bar 26 which presses against the active protrusion 29.

In this locking position, it is then no longer possible to rotate the supporting bolt 4 because the outer contour of the hexagon head 7 of the bolt head 5 blocks the supporting bolt head 5 in rotation direction vis-à-vis the lifting eye 2 by the outer surfaces of the second rocker arms 31 of the two rockers 17 resting against each other.

In this blocking position, the operator can then, by gripping the lifting eye 2 and rotating it, transfer this torque via the locking members formed as rockers 17 to the rocker head 5 and thus to the threaded shaft 6 of the supporting bolt 4, with the result that, by rotating the lifting eye 2, it is thus possible to screw the threaded shaft 6 into a body to be attached. In order to also always make possible a good alignment of the supporting bolt 4 or its threaded shaft 6 in the direction of load, the supporting bolt 4 sits in the insertion opening 3 with a little play and, as soon as the rockers 17 are tilted back into their other rocker end-position, namely the starting position, is freely rotatable relative to the lifting eye 2.

The rockers 17 can be produced in any suitable shape, whether as sheet-metal moulded parts, but in particular also as cast parts, or by any other suitable manner of production.

It is no problem whatever to design and arrange the rockers 17 such that in each of their tilt end-positions they do not project radially over the base surface circumscribed by the outer circumference of the end plate 13 of the collet 10, with the result that a problem-free rotation of the lifting eye 2, also in the locking position of the rocker 17, is also possible in a very confined space.

The shaping of the first and of the second rocker arm 30 or 31 of each rocker 17 is carried out such that in each tilt end-position the rocker arm 30 or 31 concerned, via which the rocker is supported in the end-position concerned vis-à-vis the lifting eye 2, lies approximately perpendicular to the supporting surface concerned, with the result that a support at the favourable support angle of approximately 90° is achieved. Only the first rocker 30 is somewhat arched outwardly at its freely protruding end area relative to its other surface, in order that it can be easily gripped from below from the outside by the operator with his fingers in the starting position (cf. FIG. 4) and raised.

The above-described embodiment of the eye bolt makes it possible to screw or unscrew the eye bolt, relative to an item to be accommodated, without tools, wherein the item arranged on the supporting bolt 4 can be freely rotated relative to the lifting eye 2 after screwing on the item and tilting the rocker into its starting position.

The shaping of the elements cooperating during the tilting of the rockers 17, namely shaping 28 on the rocker 17 with active protrusion 29 and spring plate 25, with the shaping of the spring bar 26 can be chosen not only such that in each tilt end-position of a rocker 17 a predetermined magnitude of the elastic force pressing it into its tilt end-position is achieved by the spring bar 26. The shaping can furthermore also be carried out such that a particular, predetermined magnitude of the deflection of a rocker 17 out of each of its end-positions must first be overcome before the elastic restoring force of the spring bar 26 then presses and deflects the rocker 17 tilted to this extent, under pretension, towards its other tilt end-position, in order to prevent the possibility of an inadvertent and unintentional displacement of the rocker 17 concerned from a tilt end-position.

In the case of the above-described eye bolt, a particularly simple and time-saving handling for the user can be achieved because an additional tool for screwing and unscrewing the threaded bolt 6 is no longer necessary.

The invention claimed is:

1. An eye bolt, comprising a lifting eye and a supporting bolt, wherein the supporting bolt sits, rotatable, in an insertion opening of the lifting eye and comprises, a threaded shaft and a bolt head, the supporting bolt protruding radially from the lifting eye and being supported by an underside of the lifting eye, on a bearing surface formed on the lifting eye and running around the insertion opening, wherein the eye bolt further comprises at least one locking member which can be brought into engagement with the bolt head, the at least one locking member in a locking position causing the bolt head to be rotationally blocked vis-à-vis the lifting eye, the at least one locking member being attached to the lifting eye radially next to the bolt head and secured there, wherein the at least one locking member can be brought into a starting position, in which it is not engaged with the bolt head, and also into the locking position rotationally blocking the supporting bolt relative to the lifting eye, the at least one locking member comprises two locking members radially opposite each other in respect of the bolt head, wherein each locking member is formed as a rocker and sits in an upper recess to the side of the insertion opening on the lifting eye and wherein the recess is aligned perpendicular to the center axis of the insertion opening and each locking member sits on a pivot axle, lying perpendicular to the alignment of the recess, which for its part is held rotatably by a retaining clasp, secured in the recess, wherein the retaining clasp comprises a U-shaped cross-section with two side arms connected to each other via a center bar.

2. The eye bolt according to claim 1, wherein each rocker is provided on its underside facing the retaining clasp with a shaping which is in active connection with a spring bar having a starting shape and protruding from the center bar of the retaining clasp such that, during a tilting movement of the rocker, the tilting movement comprising a tilt end-position, it elastically deforms the spring bar when the latter is overrun, wherein, when the tilt end-position is reached, the spring bar resumes its starting shape in which it locks the rocker via the shaping in the respective tilt end-position.

3. The eye bolt according to claim 2, wherein each rocker is supported via a first rocker arm in its starting position on the lifting eye and in its locking position via a second rocker arm on a surface, running around the supporting bolt below its bolt head and radially protruding from the bolt head at least in sections, of a ring band bearing the bolt head.

4. The eye bolt according to claim 3, wherein for each rocker in each of its tilt end-positions the outer surface, facing away from the pivot axle, of its second rocker arm in each case supported there lies approximately parallel to the longitudinal center axis of the supporting bolt.

5. The eye bolt according to claim 1, wherein the rocker is provided on its underside facing the retaining clasp with a shaping which is in active connection with a spring bar having a starting shape and protruding from the center bar of the retaining clasp such that, during a tilting movement of the rocker, the tilting movement comprising a tilt end-position, it elastically deforms the spring bar when the latter is overrun, wherein, when the tilt end-position is reached, the spring bar resumes its starting shape in which it locks the rocker via the shaping in the respective tilt end-position.

6. The eye bolt according to claim 5, wherein the rocker is supported via a first rocker arm in its starting position on the lifting eye and in its locking position via a second rocker arm on a surface, running around the supporting bolt below its bolt head and radially protruding from the bolt head at least in sections, of a ring band bearing the bolt head.

\* \* \* \* \*